United States Patent [19]

Ehrenkranz

[11] Patent Number: 4,564,299
[45] Date of Patent: Jan. 14, 1986

[54] BODY LIQUID TEMPERATURE MEASURING DEVICE

[76] Inventor: Joel R. Ehrenkranz, 146 Irving Ave., So. Orange, N.J. 07079

[21] Appl. No.: 620,970

[22] Filed: Jun. 15, 1984

[51] Int. Cl.$^4$ .................... G01K 13/00; G01N 1/10
[52] U.S. Cl. ................... 374/157; 73/863.52; 128/771; 374/159
[58] Field of Search ............ 374/157, 160, 161, 162; 73/863.52; 128/771, 761

[56] References Cited

U.S. PATENT DOCUMENTS

| | | | |
|---|---|---|---|
| 2,271,254 | 1/1942 | DeWitt | 374/157 |
| 3,625,654 | 12/1971 | Van Duyne | 73/863.52 X |
| 3,718,431 | 2/1973 | Wild | 73/863.52 X |
| 3,774,455 | 11/1973 | Seider et al. | 73/863.52 X |
| 3,830,107 | 8/1974 | Linzer et al. | 128/761 X |
| 4,382,063 | 5/1983 | Romito et al. | 116/207 |
| 4,408,905 | 10/1983 | Ehrenkranz | 374/157 |
| 4,459,936 | 7/1984 | Karle | 116/207 |

Primary Examiner—Daniel M. Yasich
Attorney, Agent, or Firm—Richard C. Woodbridge

[57] ABSTRACT

A temperature measuring device for accurately measuring core body temperature is disclosed. The device utilizes freshly voided urine and the temperature thereof has been found to be an accurate measurement of said core body temperature. The device includes a receptacle having a well therein and a means for measuring temperature which preferably is a chemical thermometer. The well holds a sample of at least about 25 cc and includes a pedestal for mounting the temperature measurement device thereon so that in use the temperature measurement device will be submerged in the sample. Any conventional temperature measurement device may be used, including a chemical thermometer, an electronic thermometer, or the conventional mercury-in-glass thermometer. The device is intended to be stackable and disposable in the preferred embodiment.

18 Claims, 4 Drawing Figures

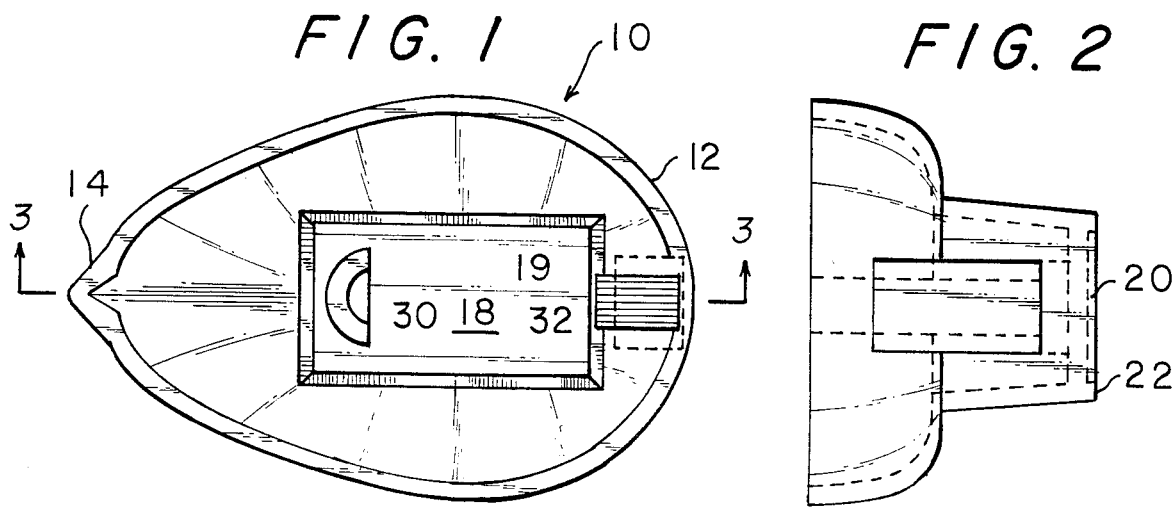
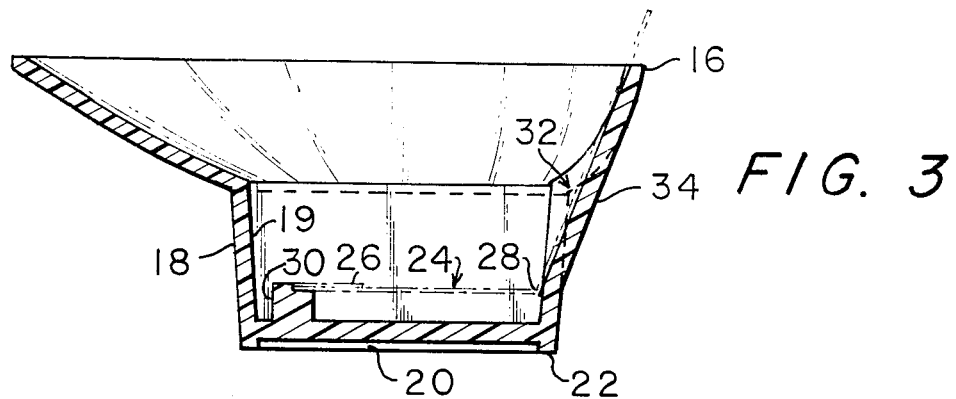
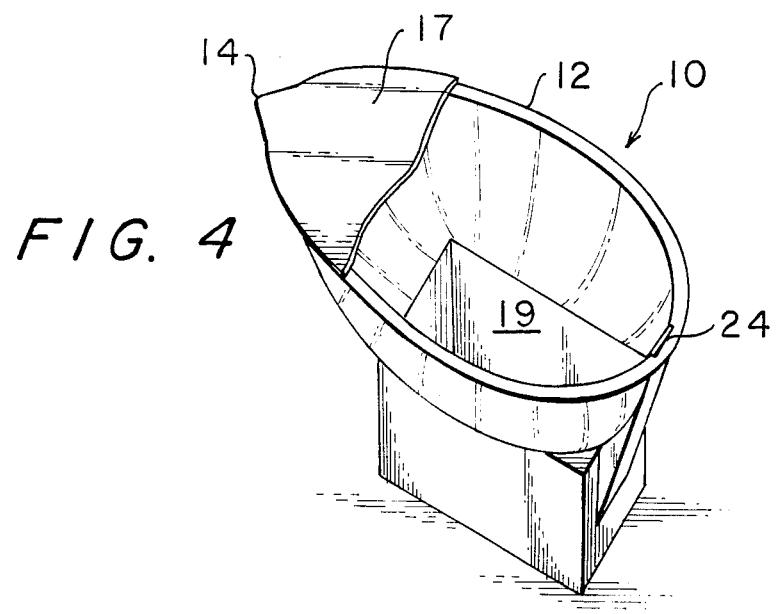

BODY LIQUID TEMPERATURE MEASURING DEVICE

A method and apparatus for accurately and efficiently measuring core body temperature is disclosed. The invention relates to the measurement of core body temperature by measuring the temperature of urine in a device which preferably is disposable. The device of this invention then is suited for temperature measurement in children, adults, and even in animals, and will provide an accurate temperature reading without the discomfort of insensitivity associated with a rectal thermometer, and without the inaccuracy associated with an oral thermometer. The measurement of core body temperature by a urinary thermometer then will provide an accurate reading of core body temperature with sufficient accuracy to serve any medical purpose including, without limitation, the measurement of fertility cycles in females.

In my prior U.S. Pat. No. 4,408,905, there was disclosed a device for measuring urine temperature which consisted of a funnel-shaped container having, at its base, a liquid crystal temperature array in an insulated chamber. Liquid crystal arrays are commercially available and have been marketed in disposable form. Accordingly, the disclosure in my above prior patent is hereby incorporated by reference.

The device of this invention is intended to be a stackable preferably disposable collection vessel having a temperature measuring device therein which, in the preferred embodiment, could be a chemical thermometer, or in alternative embodiments could be an electronic thermometer or even a mercury-glass thermometer. In the preferred embodiment, however, the device is intended to be disposable and dispensable in stacks so that the device will be as readily usable as the common household oral thermometer. However, the device is also intended to be sufficiently accurate so that it is equally usable in hospitals by physicians. Typically the device is suitable for patients whose temperature would be difficult to measure orally or rectally, but the device is intended for universal application to repace existing oral or rectal thermometers.

As noted above, the measure of urinary temperature has been validated as an accurate measure of core body temperature. It is well known that the use of an oral thermometer produces a temperature which may vary depending upon placement in the mouth. Oral temperature is also affected by eating, drinking, talking, smoking, or by tachypnea. Rectal temperature measurement, in addition to being uncomfortable to the patient, also is less sensitive to acute fluctuations in core temperature. Rectal thermometry is also associated with rectal perforation in children and may produce transient bacteremia, making it contra-indicated in immunocompromised patients. A third alternative is axillary temperature, but this is affected by the ambient temperature and humidity and is utilized only when other sites are impractical, as in infants.

The urinary temperature, however, as noted above, is in equilibrium with the core body temperature. It has been validated as 0.2 degrees C. greater than oral, and 0.3 degrees C. less than rectal temperature. The urinary means for measuring temperature is subject only to the ability of a patient to provide a sample of about 30 cc for temperature measurement, and therefore is inapplicable to patients suffering from altered mental status, incontinence, and oliguria. This is generally thought to affect about 8% of the patient population. Accordingly, the device of this invention should be subject to nearly universal application as an accurate and efficient means for measuring temperature.

The device of this invention is intended to be constructed of an insulating plastic material. As noted above, the device is suitable for use with any conventional temperature measuring device, including an electronic device, a mercury-glass device, or a chemical thermometer. The chemical thermometer could be a disposable thermometer such as that disclosed in U.S. Pat. Nos. 4,232,552, or 4,189,942, or may be a liquid crystal reusable thermometer. The device is intended to provide in a self-insulating design a receptacle for about 25-30 cc of urine with a mounting means for the thermometer. In the case of a chemical thermometer, the thermometer can be received in a groove, or can be mounted either with adhesive or force fitted, but is intended to rest on a mounting shelf in the base of the receptacle. It is also intended that the receptacles preferably are stackable so that when disposable units are used, they will be easily stored and readily available.

Accordingly, it is an object of this invention to provide a device for measuring core body temperature accurately and without discomfort to the patient.

It is another object of this invention to provide a disposable device for measuring urinary temperature which will accurately and efficiently provide a measurement of core body temperature.

It is yet another object of this invention to provide a receptacle for measuring core body temperature which is sufficiently accurate to measure the fertility cycle in females, and also which may be utilized in general application for temperature measurement in a wide variety of patients.

It is yet another object of this invention to provide a stackable disposable receptacle having a thermometer therein which may be used to measure temperature and then discard it so that temperature measurements need not be subject to variation, but will be accurate.

It is yet another object of this invention to provide a means for measuring urinary temperature, which includes a receptacle for voided urine which can also serve as a storage vessel, and which incorporates a thermometer therein and may have a lid affixed thereto so that the urine sample may be used to measure core body temperature of the patient, and then stored as desired for further analysis.

These and other objects will become readily apparent with reference to the drawings and following description wherein:

FIG. 1 is a top view of the receptacle of this invention;

FIG. 2 is a right side view of the receptacle of FIG. 1;

FIG. 3 is a cross-sectional view taken along lines 3—3 of FIG. 1, and showing a temperature indicating device in phantom; and FIG. 4 is a perspective view of the device of this invention showing a lid partially broken away.

With attention to the drawings, FIG. 1 illustrates a receptacle 10 having a generally elliptical upper portion 12 which has, at a side thereof, a pouring spout 14. The device is intended to provide a circumferential upper lip portion 16 suitable to receive a lid 17 which is intended to be force fitted thereover to provide an air and liquid tight closure. The lid obviously would have the configuration of the lip 16.

The device further includes a base portion 18 which functions to receive a urine sample, and also functions to stabilize the device for stacking or storage. Accordingly, the upstanding walls 19 are slightly tapered. The base 18 is intended to hold a sample of about 25 cc of urine.

It is important to note that the accuracy of the device of this invention depends upon minimizing temperature variations due to surface cooling, or heat conducted from the base of the container. Accordingly, the base portion 18 is of restricted surface area as compared to the upper funnel portion 12. Most importantly, the base 18 defines a recess 20 which provides a dead air space insulating the sample contained within the device 10 from the surface upon which the base 18 rests. A circumferential edge 22 of restricted diameter is provided to support the device on a surface (not shown) during storage. Prior to use, however, units will be stacked in conventional fashion, one within another. After use the lid 17 may be affixed for storage if the sample is to be retained.

Although the device of this invention is suitable for use with any temperature measurement means, the preferred embodiment includes a chemical thermometer 24 which contains a temperature array 26 mounted on a bendable plastic substrate 28. The temperature array 26 on the substrate 28 is received in a mounting pedestal 30 and may be affixed thereto with adhesive, as desired.

The device 24 is typically bent to extend the length of the base 18 and is received along a groove 32 in the side wall 34 of the device 10. The temperature measuring device 24 may be either secured by a conventional adhesive, or force fitted into the groove 32. In either event, it is intended in the preferred embodiment that the assembled device be stackable for ease in dispensing. The device 24 may be removable for storage.

The pedestal 30 is critical to the device of this invention in that it provides a depth locator for the thermometer to minimize the effect of the cooling gradient at the exposed surface of the sample. In the preferred embodiment of this invention, the dimensions of the urine well in base 18 are approximately length 1.958 inches. depth 0.900 inches, and width 0.983 inches. The pedestal 30 is preferably about 0.200 inches in height. The recess 20 in base 18 is preferably about 0.062 inches deep. In contrast, the length of the upper funnel portion 12 is preferably about 4.135 inches, and the width preferably about 2.650 inches.

As noted above, any conventional temperature measuring device is suitable for use with the device of this invention. It is preferred, however, to use either a chemical melting point or liquid crystal type thermometer available from Bio-Medical Sciences, Fairfield, N.J., or a melting-point type thermometer available from Info-Chem, Inc., Fairfield, N.J. The latter thermometer is normally not reusable, and reusable thermometers are available from Bio-Medical Sciences. These thermometers produce an accuracy of ±0.2 degrees C. in measurement of deep body temperature using urine samples voided directly into the device 10. Similarly, the temperature reading can be used to document that the sample was fresh, thereby demonstrating sample integrity.

In summary, the device of this invention is intended to be a reusable or disposable means for rapidly and efficiently measuring temperature with an accuracy heretofore not available. The device avoids the problems associated with both oral and rectal temperature measuring devices and is fully capable of use with nearly all patients as a general fever thermometer. The device also is sufficiently accurate to plot a fertility cycle in females and, as will be obvious to those skilled in the art, may be adapted for use with even animals as a temperature measurement device. The device incorporates a funnel portion and a well portion. The well portion is adapted to contain an optimum volume for a temperature reading, and is of sufficient depth to ensure that the temperature reading is not affected by a cooling gradient at the surface thereof, or by heat transfer at the base. The device is intended to be stackable for easy storage and for dispensing, and preferably uses a chemical thermometer on a bendable plastic substrate which may be affixed to the side thereof either by force fitting in a groove, or by adhesives. The device is intended to, as desired, provide either a reusable means for measuring temperature, or, in the case of a chemical thermometer, a permanent record of the core body temperature when the sample was voided. In the latter instance, the chemical thermometer will record a temperature, and if the sample is stored, will maintain a permanent record of that temperature.

The invention may be embodied in other specific forms without departing from the spirit or essential characteristics thereof. The present embodiment is, therefore, to be considered in all respects as illustrative and not restrictive, the scope of the invention being indicated by the appended claims and all changes which come within the meaning and range of equivalency of the claims are, therefore, intended to be embraced therein.

What is claimed is:

1. An apparatus for determining core body temperature by measuring the temperature of urine comprising:
   a receptacle for receiving said urine, said receptacle including an upper portion having an opening therein, a base portion which functions to receive said sample of urine, a circumferential lip portion surrounding said opening, said opening have a generally eliptical shape and adapted to receive urine from human females;
   a lid means for engaging said lip portion and forming an air and liquid-tight seal with respect to said lip portion;
   temperature measuring means for measuring the temperature of said urine as it is being collected and for providing an indication of said temperature for a prolonged period after collection thereby serving as an indication that said sample of urine was fresh when collected, said temperature measuring means comprising a removable chemical melting point type of thermometer;
   means for releasably attaching said temperature measuring means to said apparatus so that said temperature measuring means may be readily removed from said apparatus;
   supporting means comprising a pedestal-like means for supporting a first portion of said temperature measuring means a predetermined distance above the inside bottom of said base portion of said receptacle;
   pour spout means incorporated in said receptacle for removing urine from said receptacle; and,
   dead air space means located on the exterior of said base portion on the opposite side thereof from said pedestal-like means for insulating said urine from the temperature of exterior surfaces upon which said apparatus may rest.

2. The apparatus of claim 1 wherein said opening in said upper portion is larger in cross-sectional area than said base portion so that said apparatus may be stacked one inside the other.

3. An apparatus for determining core body temperature by measuring the temperature of a sample of urine, said apparatus comprising:

a receptacle having a well cavity therein for receiving said urine, said receptacle including an upper portion having an opening therein and a closed base portion;

temperature-measuring means comprising a substantially flat temperature sensitive means;

support means located in said well cavity for supporting a first portion of said temperature sensitive means and a second portion thereof extending along an inner wall of said receptacle, said support means comprising a pedestal-like means for supporting said temperature means a predetermined distance above said base portion, wherein urine collected in said receptacle substantially surrounds said temperature measuring means and contacts said temperature measuring means so that the temperature of said urine can be read directly from said temperature measuring means and further wherein said support means supports said temperature means at a distance far enough below the normal exposed surface of said urine as to minimize the effect of the cooling gradient of said sample of urine upon said temperature measuring means.

4. The apparatus of claim 3 wherein said temperature measuring means measures the temperature of said urine as it is being collected and provides an indication of said temperature for a prolonged period after collection thereby serving as an indication that said sample of urine was fresh when collected.

5. The apparatus of claim 4 wherein said temperature measuring means is readily removable from said apparatus.

6. The apparatus of claim 5 wherein said temperature measuring means comprises a chemical type thermometer.

7. The apparatus of claim 6 wherein said temperature measuring means comprises a chemical melting point type of thermometer.

8. The apparatus of claim 7 further including:

a circumferential lip portion surrounding the opening in said upper portion; and, a lid means for engaging said lip portion and forming an air and liquid tight seal with respect to said lip portion.

9. The apparatus of claim 8 wherein said opening is generally elliptical in shape and adapted to receive urine from human females.

10. The apparatus of claim 9 further including:

means for releasably attaching said temperature measuring means to said apparatus so that said temperature measuring means may be readily removed from said apparatus.

11. The apparatus of claim 10 further including:

a pour spout means incorporated in said receptacle for removing urine from said receptacle.

12. The apparatus of claim 11 further including:

dead air space means located on the exterior of said base portion on the opposite side thereof from said pedestal-like means for insulating said urine from exterior surfaces upon which said apparatus may rest.

13. The apparatus of claim 12 wherein said opening in said upper portion is larger in cross-sectional area than said base portion so that said apparatus may be stacked one inside the other.

14. The apparatus of claim 3 wherein said temperature measuring means comprises a liquid crystal type thermometer.

15. An apparatus for determining core body temperature by measuring the temperature of a sample of urine, said apparatus comprising:

a receptacle having a well cavity therein for receiving said urine, said receptacle including an upper portion having an opening therein and a closed base portion;

temperature measuring means comprising a temperature sensitive array;

support means located in said well for supporting said temperature sensitive array a predetermined distance above said base portion so that urine normally substantially surrounds said temperature sensitive array; and, means coupled to said temperature sensitive array extending along the inner wall of the receptacle;

wherein said support means positions said temperature sensitive array a sufficient distance below the normal surface of said sample to minimize the effect of the cooling gradient of said sample of urine upon said temperature sensitive array and a sufficient distance above said base portion to substantially minimize heat transfer from said base portion.

16. The apparatus of claim 15 wherein said temperature sensitive array comprises a chemical melting point type of thermometer.

17. The apparatus of claim 15 further including:

dead air space means located on the exterior of said base portion on the opposite side thereof from said support means for insulating said urine from the temperature of exterior surfaces upon which said apparatus may rest.

18. The apparatus of claim 15 further including:

releasable means for releasably attaching said temperature measuring means to said apparatus so that said temperature sensitive array may be readily removed from said apparatus.

* * * * *